(12) United States Patent
Otsuki

(10) Patent No.: US 7,073,184 B2
(45) Date of Patent: Jul. 4, 2006

(54) DISK APPARATUS

(75) Inventor: Akira Otsuki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 725 days.

(21) Appl. No.: 10/341,312

(22) Filed: Jan. 13, 2003

(65) Prior Publication Data

US 2003/0151986 A1   Aug. 14, 2003

(30) Foreign Application Priority Data

Jan. 17, 2002  (JP)  ............................. 2002-008626
Jan. 17, 2002  (JP)  ............................. 2002-008680

(51) Int. Cl.
*G11B 33/02*  (2006.01)

(52) U.S. Cl. ..................................................... 720/615

(58) Field of Classification Search ............. 369/30.85; 720/614, 615, 619
See application file for complete search history.

(56) References Cited

U.S. PATENT DOCUMENTS 6,097,693 A   8/2000   Nakamichi

*Primary Examiner*—William Klimowicz
*Assistant Examiner*—Mark Blouin
(74) *Attorney, Agent, or Firm*—Brinks Hofer Gilson & Lione

(57) ABSTRACT

A disk apparatus includes a stock section for storing a plurality of stacked disks, a disk transfer mechanism for withdrawing a selected disk out of the stock section, a selection mechanism for causing the selected disk and the disk transfer mechanism to face each other, a rotating section for driving the disk, a common motor, a power transmission mechanism for selectively transmitting the power of the motor to the selection mechanism and to the disk transfer mechanism, and a switching mechanism for switching between a first switching state in which the power of the motor is transmitted to the disk transfer mechanism and a second switching state in which the power of the motor is transmitted to the selection mechanism. The switching mechanism is switched between the states by the moving force of the disk transfer mechanism moving between a transfer-force transmitting position and a transfer-force interrupting position.

19 Claims, 9 Drawing Sheets

DISK APPARATUS

BACKGROUND OF THE INVENTION

1. Field of the Invention

The present invention relates to a disk-selection apparatus in which a disk selected from a plurality of disks stored in a stock section is withdrawn and driven, and more particularly, to a disk apparatus in which a selection mechanism for selecting a disk from a stock section and a disk transfer mechanism for transferring a disk are driven by a common motor.

2. Description of the Related Art

In some disk apparatuses to be mounted, for example, in cars, a plurality of disks is held in a stock section, and a selected disk is withdrawn from the stock section for playback and recording. These disk apparatuses include a disk transfer mechanism for transferring a disk to the stock section and withdrawing a disk from the stock section, and a selection mechanism for changing the relative positions of the stock section and the disk transfer mechanism so that the disk selected from the stock section and the disk transfer mechanism face each other. One disk holder is selected from the stock section by the selection mechanism. A disk held in the disk holder is withdrawn by the disk transfer mechanism, transferred to a rotating section, and clamped therein.

In the above disk apparatuses, in general, a motor for driving the disk transfer mechanism and a motor for driving the selection mechanism are separately provided. However, the use of separate motors increases the cost of the apparatus and interferes with size reduction of the apparatus.

SUMMARY OF THE INVENTION

The present invention has been made to overcome the above problems. An object of the present invention is to provide a disk apparatus in which the transmission of power from a common motor can be switched between a disk transfer mechanism and a disk selection mechanism, the switching can be made with a simple structure, and the switch timing can be precisely determined.

In order to achieve the above object, one embodiment of the present invention provides a disk apparatus including a stock section in which a plurality of disks are stored while being stacked in the axial direction, a disk transfer mechanism for withdrawing a selected disk from the stock section, a selection mechanism for changing the relative positions of the stock section and the disk transfer mechanism so that the selected disk and the disk transfer mechanism face each other, a rotating section for driving the disk withdrawn from the stock section, a common motor for supplying power to the selection mechanism and to the disk transfer mechanism, a power transmission mechanism for selectively transmitting the power of the motor to the selection mechanism and to the disk transfer mechanism, and a switching mechanism provided in the power transmission mechanism to switch between a first switching state in which the power of the motor is transmitted to the disk transfer mechanism and a second switching state in which the power of the motor is transmitted to the selection mechanism. The switching mechanism is switched between the first switching state and the second switching state by a moving force produced when the disk transfer mechanism moves between a transfer-force transmitting position at which a transfer force is transmitted to the disk and a transfer-force interrupting position spaced apart from the disk.

In the disk apparatus, since the disk transfer mechanism and the selection mechanism are driven by a common motor, the number of motors can be reduced. Furthermore, since the transmission path of the power is switched by the moving force produced when the disk transfer mechanism moves between the transfer-force transmitting position and the transfer-force interrupting position, the structure of the switching mechanism can be simplified, and the switch timing for the power transmission path can be determined precisely.

The stock section may be provided in a housing, and a disk holder may be selected by moving disk holders in the stock section, as in the following embodiment. Alternatively, a magazine that stores a plurality of disks may be fixedly mounted in a housing, and a disk may be selected by moving the position of the disk transfer mechanism in the direction of arrangement of the disks in the magazine.

Preferably, the disk transfer mechanism includes a pair of holding members that hold the outer peripheral edge of the disk and apply a transfer force to the disk, and the holding members move between the transfer-force transmitting position where they hold the disk therebetween and the transfer-force interrupting position spaced apart from the disk.

Preferably, the disk is held in the axial direction by the pair of holding members, and the switching mechanism is switched between the first switching state and the second switching state by the moving force produced when the holding members move away from a recording surface or a label surface of the disk.

Preferably, the disk apparatus further includes a lock member for locking the selection mechanism when the switching mechanism is placed in the first switching state. The lock member locks any portion of the power transmission path from the motor to the selection mechanism.

By being locked while the power of the motor is transmitted to the disk transfer mechanism, the selection mechanism can be prevented from being inadvertently moved, for example, by vibration, during the transfer of the disk.

By operating the lock member by the moving force of the disk transfer mechanism, it is possible to precisely determine the timing of locking and unlocking of the selection mechanism.

Preferably, the disk apparatus further includes an urging member that stably holds the selection mechanism in the first switching state and the second switching state. The urging member is, for example, a torsion spring. By thus providing the urging member that stably holds the switching mechanism in the first switching state and the second switching state, the state of the switching mechanism can be prevented from being inadvertently switched, for example, by vibration.

Further objects, features, and advantages of the present invention will become apparent from the following description of the preferred embodiments with reference to the attached drawings.

DESCRIPTION OF THE PREFERRED EMBODIMENTS

Figure 1:
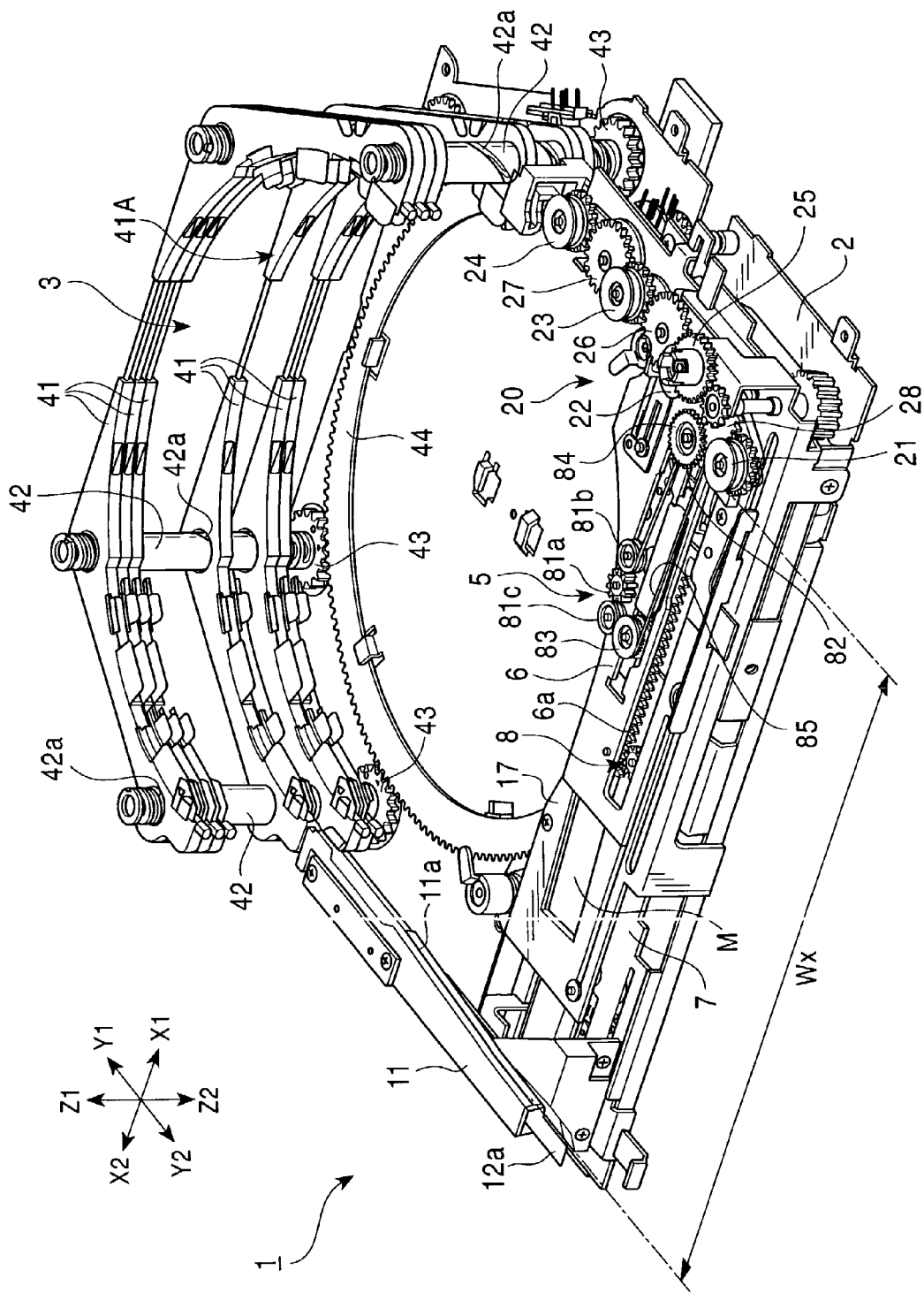
FIG. 1 is a perspective view showing the inner configuration of a disk apparatus according to the present invention.
Figure 2:
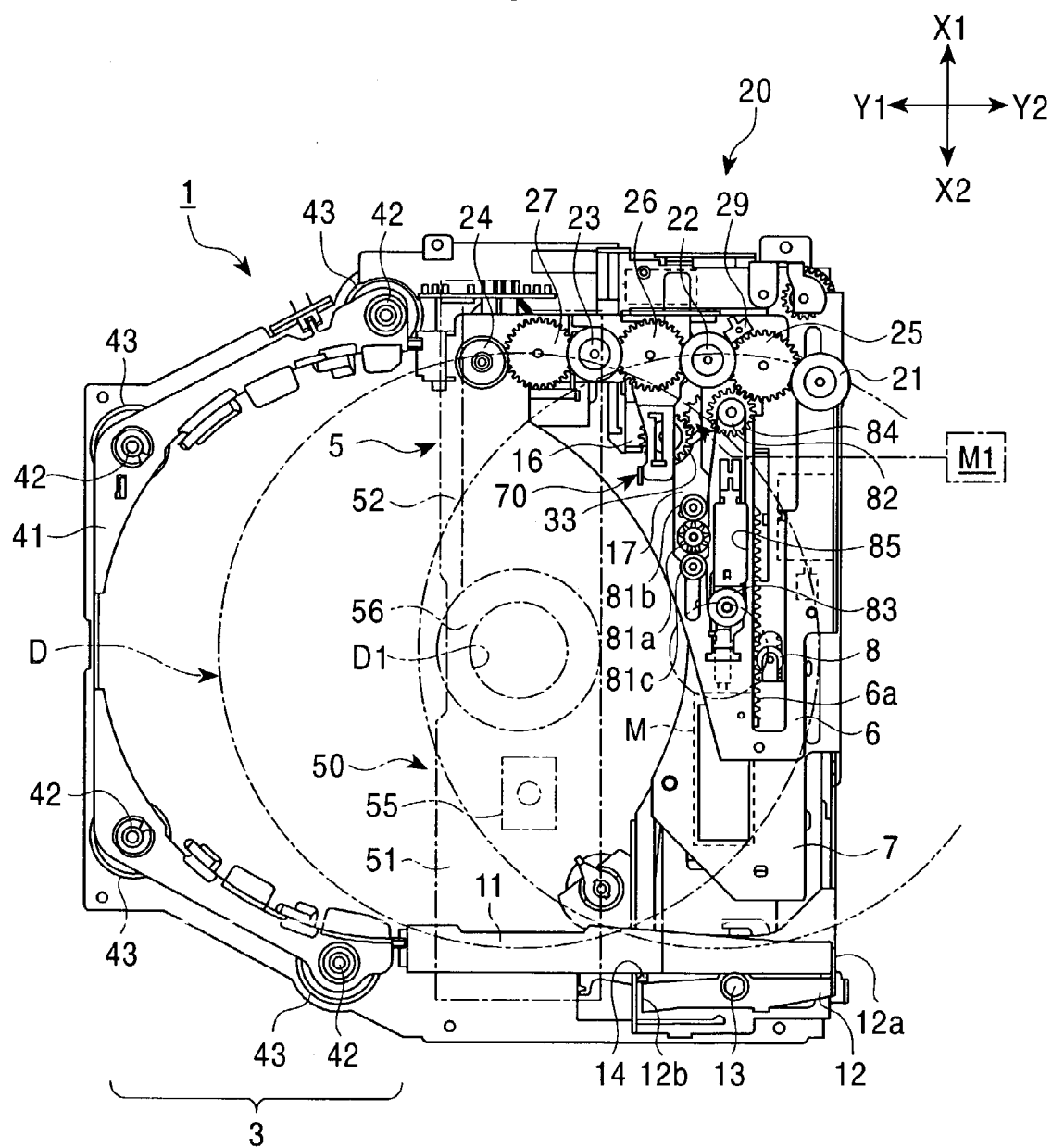
FIG. 2 is a plan view of the disk apparatus.

A disk apparatus 1 shown in FIGS. 1 and 2 is capable of playback and/or recording of small-diameter disks having a diameter of 8 cm and large-diameter disks having a diameter of 12 cm, such as CDs (compact disks) or DVDs (digital versatile disks). A plurality of disks of 12 cm in diameter can be stored inside the disk apparatus 1, and one of the disks is selected for driving.

Figure 15:
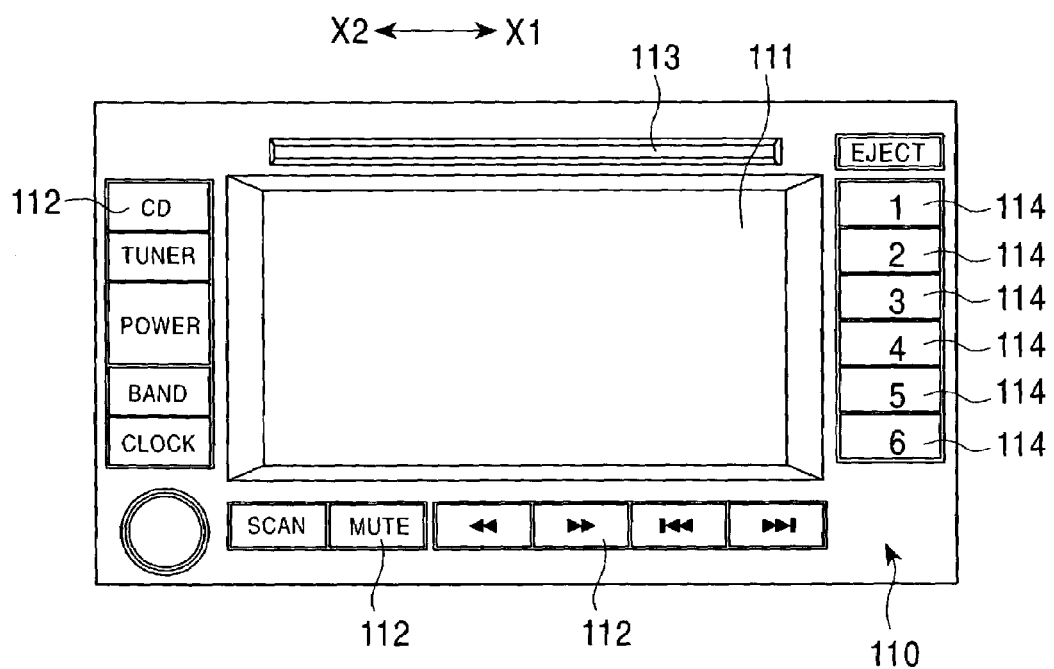
FIG. 15 is a front view of the disk apparatus of the present invention.

As shown in FIG. 15, a face section 110 having a liquid crystal display panel 111 and various switches 112 is provided on the front side (Y2-side) of the main body of the disk apparatus 1. The face section 110 also has a loading slot 113 extending in the widthwise direction (X1-X2 direction). A stock section 3 in which a plurality of large-diameter disks can be stacked in the vertical direction (Z-direction) is disposed at the back side (Y1-side) of the disk apparatus 1. The large-diameter disks are held in disk holders 41 of the stock section 3, respectively, and are stored while being stacked in the vertical direction.

As shown in FIGS. 1 and 2, a disk transfer mechanism 5 is disposed between the loading slot 113 of the face section 110 and the stock section 3 so as to carry a disk into and out of the disk apparatus 1. A first moving member 6 and a second moving member 7 are disposed on a base (chassis) 2 so that they are movable in the widthwise direction (X1-X2 direction). The first moving member 6 has a rack 6a, and the second moving member 7 has a rack opposing the rack 6a. A connecting gear 8 is disposed as a distance setting section on the base 2, and is rotationally driven by a setting motor M shown in FIG. 2. The connecting gear 8 is meshed with both the rack 6a of the first moving member 6 and the rack of the second moving member 7. When the connecting gear 8 is rotated by the setting motor M, the first moving member 6 and the second moving member 7 synchronously move closer to or further apart from each other.

The second moving member 7 is provided with a guide member 11 serving as one of the holding members that extends in the Y1-Y2 direction, the loading and ejecting direction of a disk. A long groove 11a for guiding extends in the Y-direction on the inner (X1-side) face of the guide member 11. The cross section of the long groove 11a is shaped like a letter V that opens wide on the X1 side and is narrow on the X2 side.

A detection arm 12 is provided at an ejection-side (Y2-side) end of the guide member 11. The detection arm 12 is supported so that it can turn about a shaft 13 clockwise and counterclockwise in FIG. 2, and is urged counterclockwise by an urging member (not shown).

The detection arm 12 has a detection piece 12a bent at the ejection-side end of the guide member 11. When the detection piece 12a is pushed outward (in the X2-direction) by the peripheral edge of a disk moving in the long groove 11a of the guide member 11, the detection arm 12 turns clockwise.

A pressing piece 12b bent below the plane of the figure is formed at the other end of the detection arm 12, and opposes an actuator of a loading-detecting switch 14. When the detection arm 12 is turned clockwise, the loading-detecting switch 14 is turned on by the pressing piece 12b.

When the detection arm 12 is turned counterclockwise and the detection piece 12a covers the ejection-side (Y2-side) end of the long groove 11a of the guide member 11, the pressing piece 12b separates from the actuator of the loading-detecting switch 14, thereby turning the loading-detecting switch 14 off.

A transfer section 20 is provided on the surface of the first moving member 6 so as to face the guide member 11, and includes first to fourth transfer rollers 21, 22, 23, and 24 that are arranged in the loading and ejecting direction (Y-direction) of a disk D, and transmission gears 25, 26, and 27 placed between the transfer rollers 21, 22, 23, and 24. Each of the first to fourth transfer rollers 21, 22, 23, and 24 includes flanges whose thickness gradually decreases from the center toward the outer peripheral side, and the edge of the disk D is held in a V-groove formed between the flanges. The transfer section 20 and the guide member 11 function as a pair of holding portions that constitute a disk transfer mechanism 5.

Figure 5:
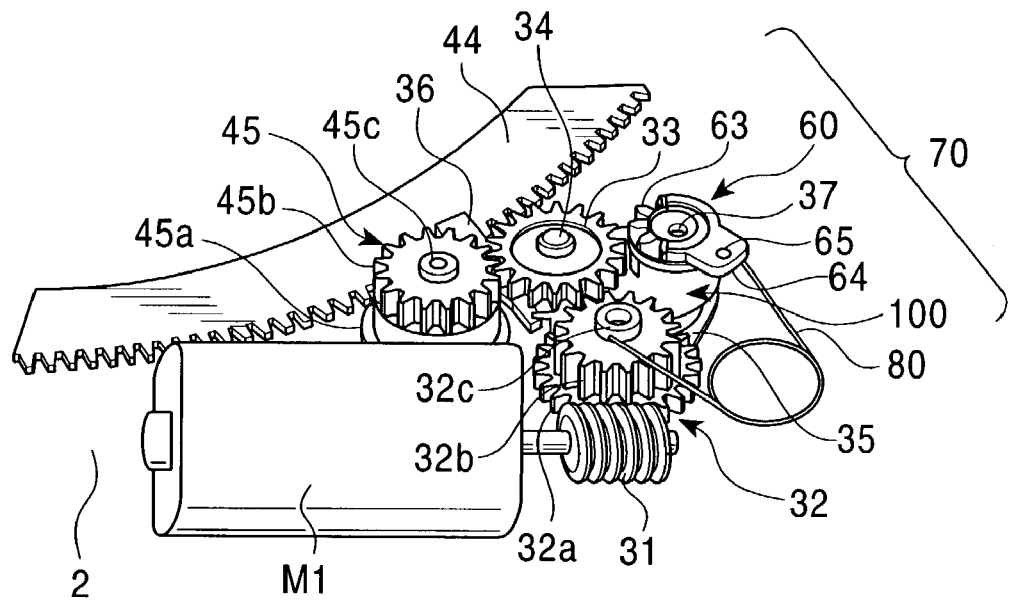
FIG. 5 is a perspective view of a switching mechanism that functions as a switching means and a lock means.

In the disk apparatus 1, a driving motor M1 is provided separate from the setting motor M (see FIG. 5). The power of the driving motor M1 is transmitted to the transfer rollers 21, 22, 23, and 24 through the transmission gears 25, 26, and 27 which are rotatably supported by the first moving member 6, thereby rotating the first to fourth transfer rollers 21, 22, 23, and 24 in the same direction. When the first to fourth transfer rollers 21, 22, 23, and 24 are rotated clockwise, the disk D is carried into the inner portion of the apparatus (in the Y1-direction). When the first to fourth transfer rollers 21, 22, 23, and 24 are rotated counterclockwise, the disk D is carried outward (in the Y2-direction).

Figure 3:
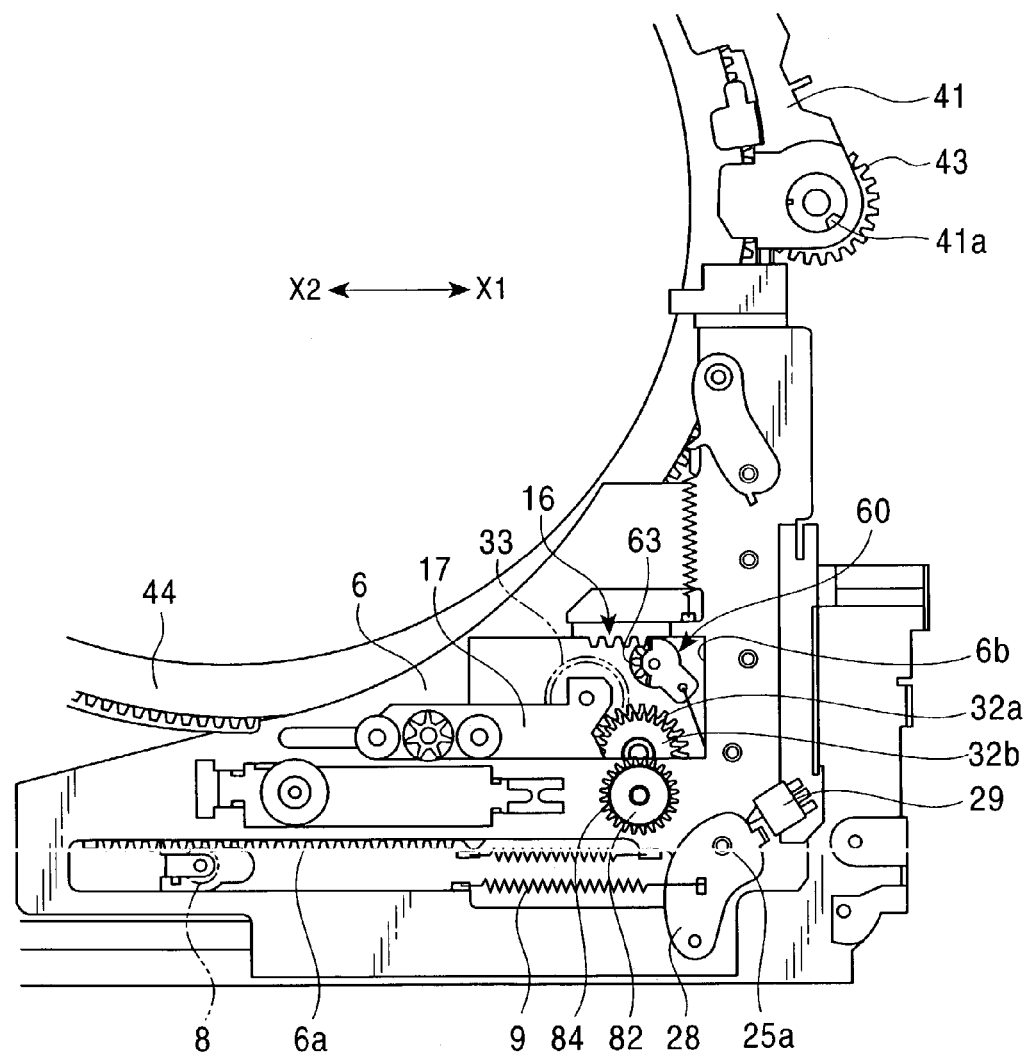
FIG. 3 is a partial plan view showing a state in which a disk transfer mechanism is placed in a transfer-force transmitting position.

As shown in FIG. 3, the first moving means 6 is provided with a pivot arm 28 that is supported so as to pivot on a shaft 25a of the transmission gear 25 within a predetermined angular range. The pivot arm 28 is constantly urged clockwise by an urging member 9 such as a tension coil spring. A loading-detecting switch 29 is also provided on the first moving member 6 so that it is turned on when the pivot arm 28 pivots counterclockwise by a predetermined angle.

A linear position sensor is disposed on the base 2 so as to detect the X-direction moving position of the second moving member 7. The linear position sensor is, for example, a linear variable resistor, and can detect the position of the second moving member 7 on the basis of the resistance that linearly changes, and as a result, can detect the opposing distance Wx between the guide member 11 and the transfer section 20.

The stock section 3 has a plurality of disk holders 41 (six in FIG. 1) vertically stacked in the axial direction of a large-diameter disk D having a diameter of 12 cm, and each of the disk holders 41 holds the front edge of a large-diameter disk D that is carried therein while being held by the guide member 11 and the transfer section 20.

A plurality of guide columns 42 vertically stand on the base 2, and are rotatably supported. Pinions 43 are fixed to the base ends of all the guide columns 42, respectively, and a ring-shaped gear 44 is disposed on the base 2 so as to be meshed with the pinions 43. When the ring-shaped gear 44 is driven by the driving motor M1, all the guide columns 42 are rotated synchronously.

A screw groove 42a is formed in the outer periphery of every guide column 42. The pitch of the screw groove 42a is small in the upper and lower portions of the guide column 42, and is large in the center portion. The disk holder 41 has a projection 41a formed in the disk holder 41 so as to be meshed with the screw groove 42a of the guide column 42. When the guide columns 42 are rotated, the disk holders 41 are vertically moved by the screw grooves 42a.

Because the pitch of the screw grooves 42a is small in the upper and lower portions of the guide columns 42, as described above, the disk holders 41 are stored so that they are tightly stacked in the upper and lower portions. Because the pitch of the screw grooves 42a is large in the center potions of the guide columns 42, the disk holders 41 can vertically move apart from the disk holders 41 vertically adjacent thereto. With the vertical movement of the disk holders 41, any of the disk holders 41 can be selected. As shown in FIG. 1, a selected disk holder 41A moves and stops at a selecting position 41A that is flush with the guide member 11 and the transfer section 20.

In this embodiment, the guide columns 42, the pinions 43, and the ring-shaped gear 44 constitute a selection mechanism for selecting a disk holder 41.

As shown in FIG. 2, a power transmission mechanism 70 is provided on the base 2 on the loading side (Y2-side) and on one side (X1-side) so as to selectively transmit the power of the driving motor M1 to the selection mechanism or the disk transfer mechanism 5.

The configuration of the power transmission mechanism 70 will be described below.

Referring to FIG. 5, a worm gear 31 is provided on the output shaft of the driving motor M1, and a double gear 32 to be driven by the worm gear 31 is rotatably supported on the base 2 by a support shaft 32c. The double gear 32 is formed of a combination of a large-diameter gear 32a and a small-diameter gear 32b. The large-diameter gear 32a is a worm wheel, and is meshed with the worm gear 31 of the driving motor M1.

A double gear 45 is provided adjacent to the double gear 32. The double gear 45 is rotatably supported on a shaft 45c fixed to the base 2, and is formed of a combination of a large-diameter gear 45a and a small-diameter gear 45b. The large-diameter gear 45a is meshed with the ring-shaped gear 44.

An idle gear 33 is disposed between the double gear 32 and the double gear 45. The idle gear 33 is supported so that it can rotate about a slide shaft 34 fixed to the base 2 and can slide in the axial direction of the slide shaft 34. The small-diameter gear 32b of the double gear 32 is wide in the axial direction. While the idle gear 33 vertically slides in the axial direction of the slide shaft 34, it is constantly meshed with the small-diameter gear 32b.

Figure 6:
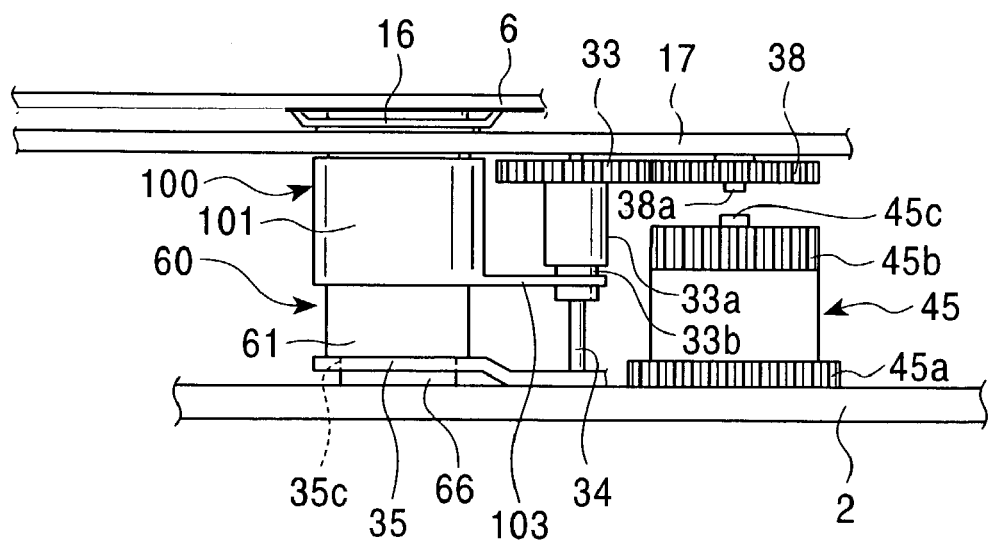
FIG. 6 is a side view of the switching mechanism in a first switching state.

As shown in FIG. 6, a fixing member 17 is fixed on the base 2 with a space therebetween by screws or the like. The fixing member 17 is also shown in FIGS. 1 and 2. The first moving member 6 is supported on the fixing member 17 and the second moving member 7 is supported under the fixing member 17 so that they can move in the X1-X2 direction.

As shown in FIG. 6, a transmission gear 38 is rotatably supported by a shaft 38a on the lower surface of the fixing member 17. The shaft 45c that supports the double gear 45 and the shaft 38a are placed on the same axis. The small-diameter gear 45b of the double gear 45 and the transmission gear 38 are the same in diameter of the pitch circle, and in tooth module.

As shown in FIGS. 1 and 2, a driving pulley 81a is rotatably supported on the upper surface of the fixing member 17, and pinch rollers 81b and 81c are rotatably supported on both sides of the driving pulley 81a. The rotating force of the transmission gear 38 is applied to the driving pulley 81a through a power transmitting section including a gear train, a toothed belt, and the like. Pulleys 82 and 83 are rotatably supported on the first moving member 6. A gear 84 is formed integrally with one of the pulleys 82, and is meshed with the transmission gear 25 of the transfer section 20.

The driving pulley 81 and the pulleys 82 and 83 are toothed pulleys, and a toothed belt 85 is stretched theremong to form a loop. That is, as shown in FIG. 2, the toothed belt 85 extends from the pulley 82, passes through a space, between the driving pulley 81a and the pinch roller 81c, through the Y1-side periphery of the driving pulley 81a, between the driving pulley 81a and the pinch roller 81c, and through a space, and reaches the pulley 82.

For this reason, wherever the first moving member 6 moves in the X-direction on the fixing member 17, power can be constantly transmitted from the transmission gear 38 to the pulley 82 through the driving pulley 81a and the toothed belt 85, and from the gear 84 to the transfer rollers 21, 22, 23, and 24 of the transfer section 20.

In the state shown in FIG. 6, the idle gear 33 is moved up along the slide shaft 34 and is meshed with the transmission gear 38. In this case, the power of the driving motor M1 is transmitted from the worm gear 31 to the idle gear 33 through the double gear 32, and then to the transmission gear 38, thereby driving the transfer rollers 21, 22, 23, and 24 of the transfer section 20, as described above.

Figure 7:
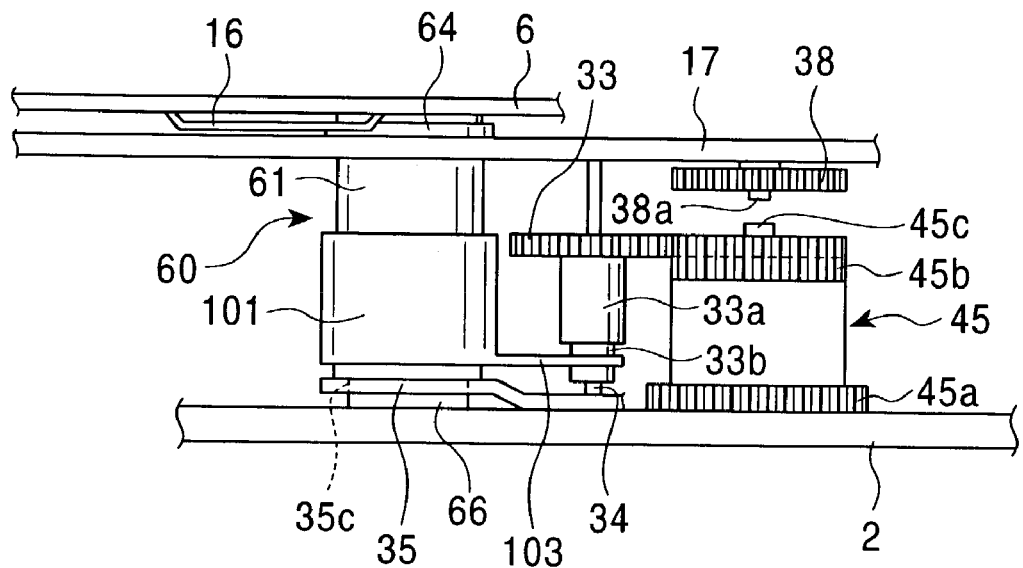
FIG. 7 is a side view of the switching mechanism in a second switching state.

FIG. 7 shows a state in which the idle gear 33 is moved down along the slide shaft 34 and is meshed with the small-diameter gear 45b of the double gear 45. In this case, the power of the driving motor M1 is transmitted from the worm gear 31 to the idle gear 33 through the double gear 32, and then to the double gear 45. The power is then transmitted from the large-diameter gear 45a of the double gear 45 to the ring-shaped gear 44 of the selection mechanism.

Figure 11:
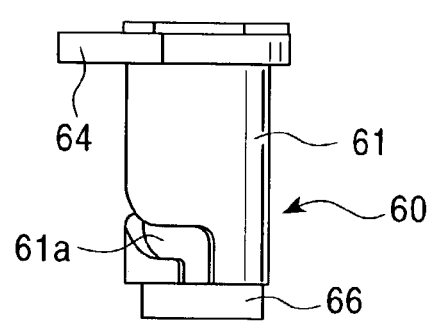
FIG. 11 is a side view of a control member.
Figure 12:
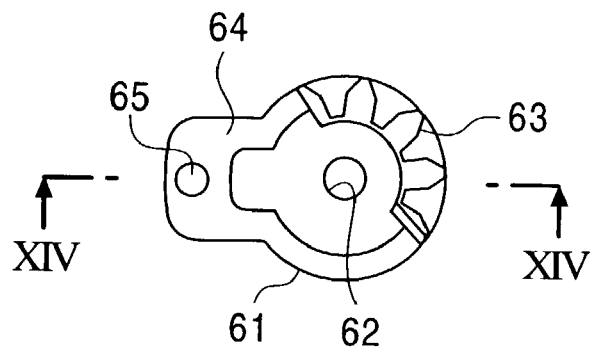
FIG. 12 is a plan view of the control member.
Figure 13:
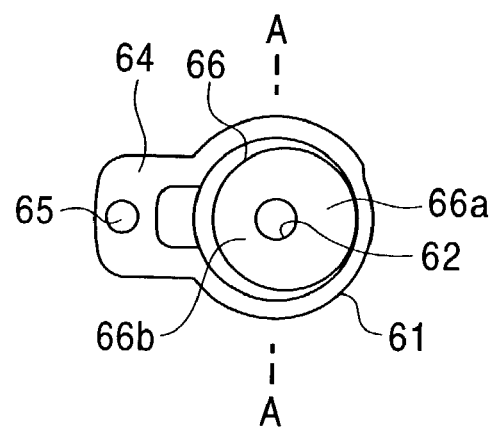
FIG. 13 is a bottom view of the control member.
Figure 14:
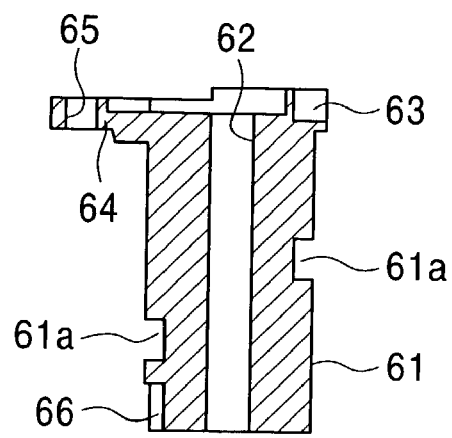
FIG. 14 is a cross-sectional view of the control member, taken along line XIV—XIV in FIG. 12.

FIGS. 11 to 13 are a side view, a top view, and a bottom view, respectively, of a control member 60 for switching the position of the idle gear 33 and for operating a lock member 35 which will be described later. FIG. 14 is a cross-sectional view of the control member 60, taken along line XIV—XIV in FIG. 12.

Referring to FIG. 14, the control member 60 has a structure in which a bore 62 is formed through a generally cylindrical rotator 61. As shown in FIG. 5, a shaft 37 is fixed on the base 2 and extends through the bore 62, so that the rotator 61 is rotatably supported on the base 2.

As shown in FIG. 11, a helical groove 61a is formed on the outer peripheral surface of the rotator 61. As shown in FIG. 12, a partial gear 63 is formed-at the top of the rotator 61. A support piece 64 is formed integrally with the rotator 61 so as to extend from the top to one side, and has a hole 65 vertically formed therethrough.

As shown in FIG. 13, a cylindrical position-switching projection 66 is formed at the bottom of the rotator 61. While the position-switching projection 66 is cylindrical, it is eccentric with respect to the bore 62. A portion of the position-switching projection 66 on the right side of a reference line A—A, which passes through the center of the bore 62 and extends in a direction orthogonal to the projecting direction of the support piece 64, is a large-diameter portion 66a that has a larger radius from the center of the bore 62, and a portion on the left side is a small-diameter portion 66b that has a smaller radius from the center of the bore 62.

As shown in FIGS. 6 and 7, a switching member 101 is fitted on the outer peripheral surface of the rotator 61 of the control member 60. The switching member 101 is substantially cylindrical, and an engaging projection (not shown) is formed on the inner surface of the cylindrical portion. The engaging projection is engaged with the helical groove 61a formed in the outer periphery of the rotator 61.

An arm 103 extending sideward is formed integrally with the bottom of the switching member 101, and has a U-shaped groove at its leading end. A support 33a is formed integrally with the bottom of the idle gear 33, and an engaging portion 33b is formed at the bottom of the support 33a. The U-shaped groove of the arm 103 is fitted on the engaging portion 33b, and the arm 103 and the engaging portion 33b are thereby connected so that they can vertically move together.

Figure 4:
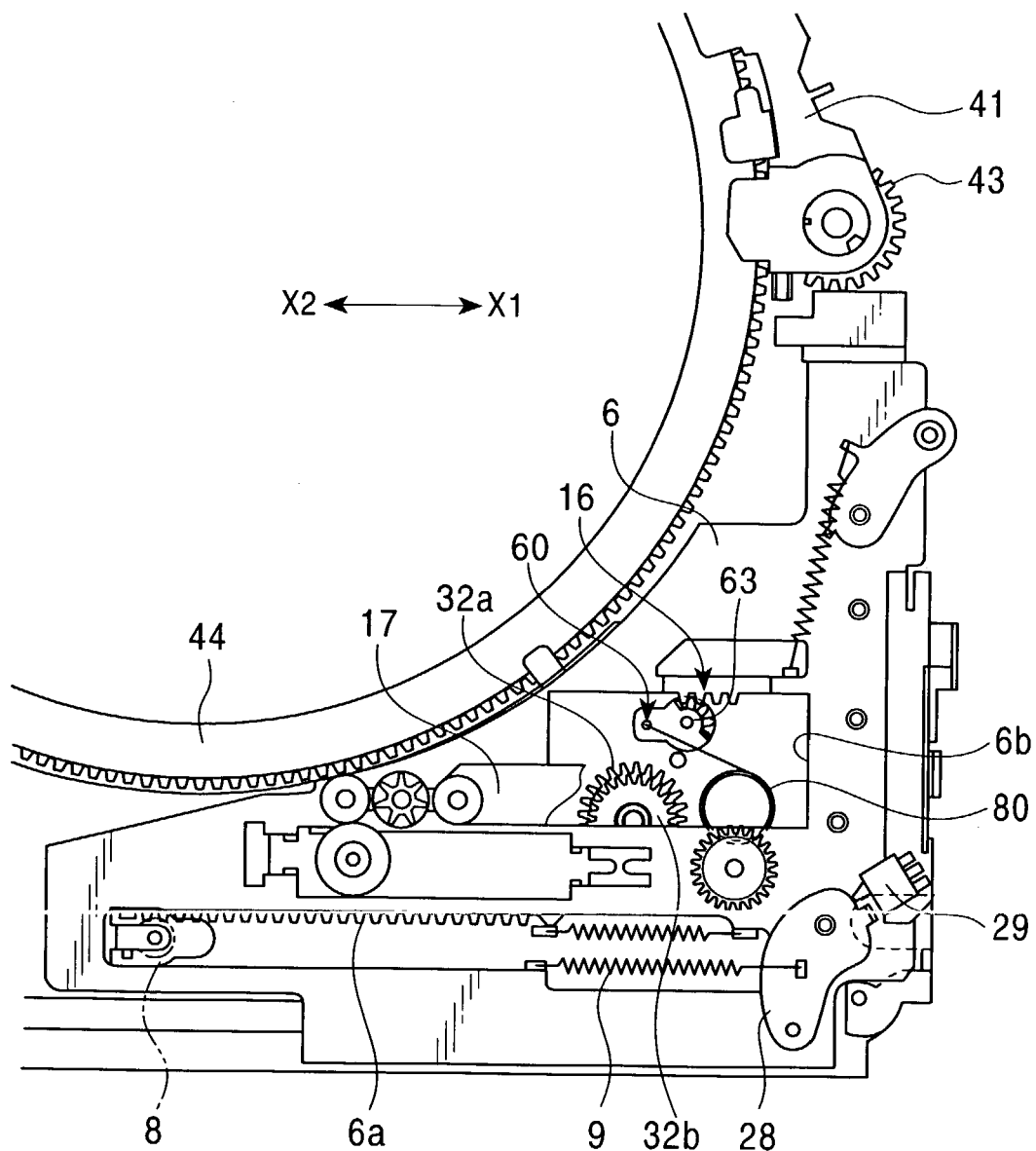
FIG. 4 is a partial plan view showing a state in which the disk transfer mechanism is placed in a transfer-force interrupting position.

When the control member 60 is turned counterclockwise, as shown in FIG. 3, a first switching state is brought about in which the switching member 101 is lifted because of the helical groove 61a of the rotator 61, as shown in FIG. 6, and the idle gear 33 is meshed with the transmission gear 38. When the control member 60 is turned clockwise, as shown in FIG. 4, a second switching state is brought about in which the switching member 101 is moved down because of the helical groove 61a, and the idle gear 33 is meshed with the small-diameter gear 45b of the double gear 45, as shown in FIG. 7.

As described above, in this embodiment, the worm gear 31, the double gear 32, the idle gear 33, the slide shaft 34, the shaft 37, the transmission gear 38, the double gear 45, the control member 60, the driving pulley 81a, the pinch rollers 81b and 81c, the pulleys 82 and 83, the gear 84, the toothed belt 85, and the switching member 101 constitute the power transmission mechanism 70 that selectively transmits the power of the common driving motor M1 to the selection mechanism or to the disk transfer mechanism 5.

In the power transmission mechanism 70, the idle gear 33, the slide shaft 34, the shaft 37, the control member 60, and the switching member 101 constitute a switching mechanism 100 that switches between a first switching state (a state shown in FIG. 6) in which the power of the driving motor M1 is transmitted to the disk transfer mechanism 5 and a second switching state (a state shown in FIG. 7) in which the power of the driving motor M1 is transmitted to the selection mechanism.

Figure 8:
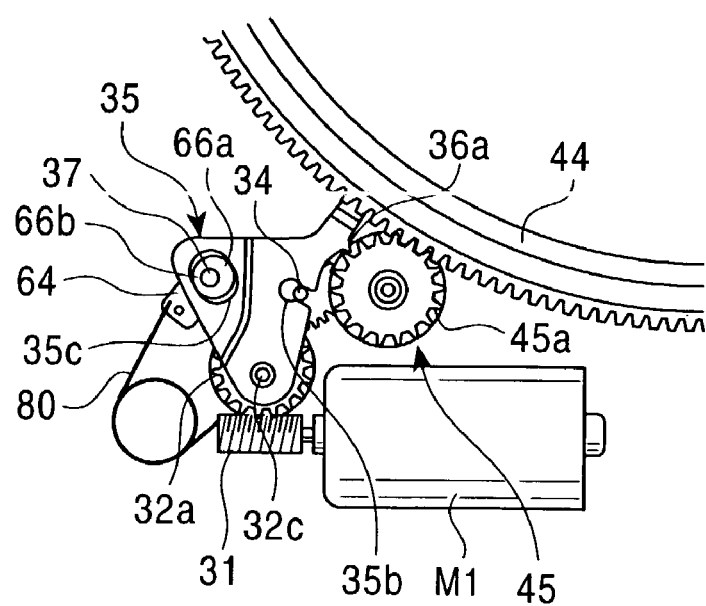
FIG. 8 is a bottom view showing a state in which a disk selection mechanism is locked in the switching mechanism.
Figure 9:
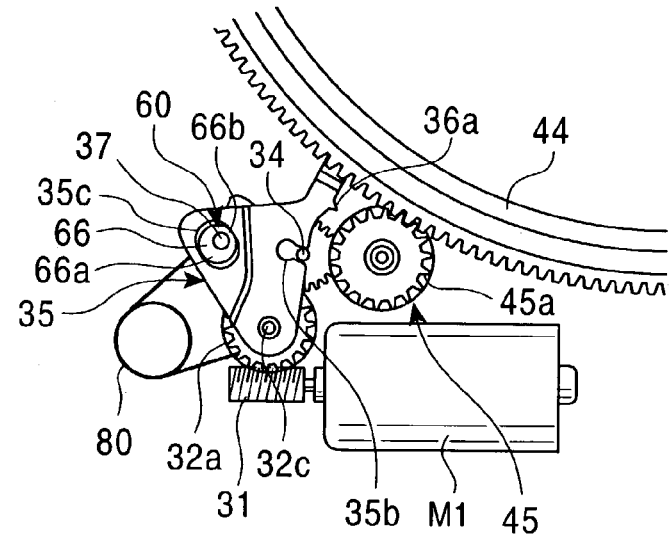
FIG. 9 is a bottom view showing a state in which the disk selection mechanism is unlocked in the switching mechanism.

FIGS. 8 and 9 are bottom views of the power transmission mechanism 70 shown in FIG. 5. Referring to these figures, a lock member 35 is pivotally supported by the shaft 32c that supports the double gear 32.

Figure 10:
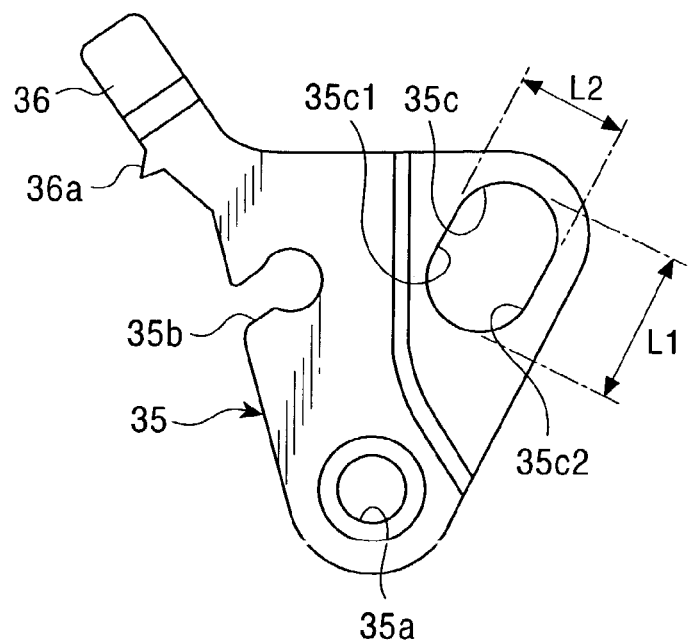
FIG. 10 is a plan view of a lock member.

FIG. 10 is a plan view of the lock member 35. The lock member 35 is made of synthetic resin and is shaped like a substantially triangular plate. A circular pivot hole 35a is formed in the lock member 35, and is rotatably fitted on the shaft 32c, so that the lock member 35 is supported on the base 2 and pivots about the shaft 32c.

A guide path 35b is also cut in the lock member 35, and is slidably fitted on the lower end of the slide shaft 34. A switch slot 35c is also formed in the lock member 35. When it is assumed that the long diameter of the switch slot 35c is designated L1 and the short diameter is designated L2, opposite edges extending along the long diameter L1 are denoted by 35c1 and 35c2. The diameter of the eccentric position-switching projection 66 formed at the bottom of the rotator 61 of the control member 60 is substantially equal to the short diameter L2, and the position-switching projection 66 turnably extends in the switch slot 35c.

An arm 36 extending toward the ring-shaped gear 44 is formed integrally with the lock member 35. The arm 36 has a lock claw 36a that opposes the large-diameter gear 45a of the double gear 45.

When a first switching state is selected by the counterclockwise turning of the control member 60, as shown in FIG. 3, since the large-diameter portion 66a of the position-switching projection 66 faces the edge 35c1 of the switch slot 35c, as shown in FIG. 8, the lock member 35 is pivoted in a direction to engage the lock claw 36a with a tooth space of the large-diameter gear 45a of the double gear 45. Consequently, the double gear 45 is locked so as not to turn, and the ring-shaped gear 44 of the selection mechanism is also locked so as not to turn. When a second switching state is selected by the clockwise turning of the control member 60, as shown in FIG. 4, since the large-diameter portion 66a faces the edge 35c2, as shown in FIG. 9, the lock member 35 is pivoted in a direction so that the lock claw 36a separates from the large-diameter gear 45a, thereby unlocking the double gear 45.

As shown in FIGS. 3 and 4, the first moving member 6 has a rack gear 16. The rack gear 16 is formed at an edge of an opening 6b in the first moving member 6, and is short in the X-direction. Between the hole 65 of the control member 60 and the upper end of the shaft 32c that supports the double gear 32, a torsion spring (urging member) 80 is provided to stably hold the control member 60 in the turning position shown in FIG. 3 and the turning position shown in FIG. 4, that is, to stably hold the switching mechanism 100 in the first switching state and in the second switching state.

When the first moving member 6 moves in the X2-direction and the transfer section 20 thereon moves to a transfer-force transmitting position to hold and transfer a small-diameter disk having a diameter of 8 cm, or to a transfer-force transmitting position to hold and transfer a large-diameter disk having a diameter of 12 cm, the rack gear 16 of the first moving member 6 is placed offset from the partial gear 63 of the control member 60 toward the X2 side, as shown in FIG. 3. In this case, the control member 60 is turned counterclockwise to bring about a first switching state, and the state is stabilized by the torsion spring 80.

When the first moving member 6 moves in the X1-direction and the second moving member 7 moves in the X2-direction, the opposing distance Wx between the transfer section 20 of the first moving member 6 and the guide member 11 of the second moving member 7 is made larger than the diameter of the large-diameter disk, and the transfer section 20 and the guide member 11 reach a transfer-force interrupting position where they do not hold the large-diameter disk. In this case, as shown in FIG. 4, the rack gear 16 is meshed with the partial gear 63 of the control member 60, the control member 60 is turned clockwise, and a second switching state is brought about. The control member 60 is stably maintained in this state by the torsion spring 80.

As shown in FIG. 2, a driving unit 50 is provided on the base 2. The driving unit 50 includes a driving chassis 51 and a clamp chassis 52. The driving chassis 51 and the clamp chassis 52 are arranged in parallel in the height direction (Z direction), and are combined with a space therebetween. The driving chassis 51 is placed below the transfer path for the disk D defined by the guide member 11 and the transfer section 20, and the clamp chassis 52 is placed above the transfer path.

The driving chassis 51 has a spindle motor, and a turntable (rotating section) 56 to be rotated by the spindle motor is provided on the upper side of the spindle motor. An optical head 55 is also mounted on the driving chassis 51. A clamper (not shown) is rotatably supported on the clamp chassis 52, and is urged downward by a leaf spring.

In the state shown in FIG. 2, the driving unit 50 is placed in a driving position. A disk D loaded from a loading slot 113 formed in the face section 110 on the front side (Y2-side) is transferred into the driving unit 50 that is stationary at the driving position shown in FIG. 2, and a center hole D1 thereof is fitted on the turntable 56. In this case, the damper is urged toward the disk D by the leaf spring, and the disk D is clamped on the turntable 56.

When a disk is selected from a plurality of disks stored in the stock section 3, a selecting operation is performed in which the ring-shaped gear 44 of the selection mechanism is rotated and the disk holders 41 of the stock section 3 are vertically moved so that the selected disk is moved to the selecting position 41A. In this case, the driving unit 50 recedes toward the loading side (Y2-side) so as not to touch the disks that move up and down with the disk holders 41.

The operation of the disk apparatus 1 will now be described.

In a standby state in which loading of a disk is awaited, the driving unit 50 is placed in the driving position shown in FIG. 2, and the opposing distance Wx between the guide member 11 and the transfer section 20 that serve as a pair of holding members is set to be smaller than the diameter (8 cm) of a small-diameter disk. When a disk is loaded in the Y1-direction from the loading slot 113, one of the detection arm 12 and the pivot arm 28 is pushed outward, one of the loading-detecting switches 14 and 29 is turned on, it is determined that the disk is loaded, and the opposing distance Wx is adjusted so as to allow a disk having a diameter of 8 cm to be held therebetween.

When the loaded disk is a small-diameter disk having a diameter of 8 cm, only one of the detection arm 12 and the pivot arm 28 is pushed outward, and both the loading-detecting switches 14 and 29 are not simultaneously turned on, but only one of them is turned on. Accordingly, in this case, the opposing distance Wx that allows the small-diameter disk to be held is maintained.

In contrast, when the disk loaded from the loading slot 113 is a large-diameter disk D having a diameter of 12 cm, the detection arm 12 and the pivot arm 28 are simultaneously pushed outward, and the two loading-detecting switches 14 and 29 are simultaneously turned on. Consequently, it is determined that the large-diameter disk D is loaded, and the first moving member 6 and the second moving member 7 are synchronously moved in the X1- and X2-directions so as to increase the opposing distance Wx between the guide member 11 and the transfer section 20 to hold and transfer the large-diameter disk D therebetween. The opposing distance Wx is determined based on the detection of the moving position of the guide member 11 with the linear position sensor.

In the standby state in which the opposing distance Wx between the guide member 11 and the transfer section 20 is smaller than the distance for holding a small-diameter disk having a diameter of 8 cm, in the transfer-force transmitting position in which the opposing distance Wx is set at the distance for holding the small-diameter disk, and in the transfer-force transmitting position in which the opposing distance Wx is set at the distance for holding a large-diameter disk D having a diameter of 12 cm, the rack gear 16 of the first moving member 6 is placed offset from the partial gear 63 of the control member 60 toward the X2-side, as shown in FIG. 3. In this case, the control member 60 is turned counterclockwise. The angular range of turning of the control member 60 is determined by the angular range in which the helical groove 61*a* shown in FIG. 11 is formed. In the state shown in FIG. 3, the control member 60 reaches the limit of the angular range of counterclockwise turning, and the turning position thereof is stably maintained by the urging force of the torsion spring 80.

Accordingly, the switching mechanism 100 is in a first switching state, and the switching member 101 is lifted by the helical groove 61*a* of the control member 60, and the idle gear 33 is meshed with the transmission gear 38, as shown in FIG. 6. In this state, the power of the driving motor M1 can be transmitted from the double gear 32 to the transmission gear 38 through the idle gear 33, and to the transfer rollers 21, 22, 23, and 24 of the transfer section 20 through the pulley 82 and the gear 84 shown in FIG. 2. In the first switching state, as shown in FIG. 8, the lock claw 36*a* of the lock member 35 is engaged with the large-diameter gear 45*a* of the double gear 45, so that the double gear 45 and the ring-shaped gear 44 are locked so as not to turn.

In the first switching state, the transfer rollers 21, 22, 23, and 24 of the transfer section 20 are rotated by the driving motor M1 so that the small-diameter disk or the large-diameter disk is transferred in the Y1-direction while being held between the guide member 11 and the transfer section 20. Therefore, the disk loaded from the loading slot 113 is supplied to the driving unit 50 and is clamped on the turntable 56. By reversing the driving motor M1 in the first switching state, a disk that has been subjected to driving by the driving unit 50 can be ejected to the loading slot 113.

When the disk clamped by the driving unit 50 is a large-diameter disk D, the disk D can be transferred and stored in a disk holder 41 placed at the selecting position 41A after the completion of driving by the driving unit 50. Since the switching mechanism 100 is in the first switching state in this case, the ring-shaped gear 44 is locked, and the disk holder 41 at the selecting position 41A is fixed so as not to move vertically. Therefore, the disk D can be reliably transferred into the disk holder 41.

When the disk D is held in the disk holder 41, the distance between the first moving member 6 and the second moving member 7 is increased by the setting motor M, and the guide member 11 and the transfer section 20 are separated from the disk D into the transfer-force interrupting position.

When the first moving member 6 moves in the X1-direction into the transfer-force interrupting position, the rack gear 16 formed in the first moving member 6 is meshed with the partial gear 63 at the top of the control member 60, and the control member 60 is turned clockwise by the moving force of the first moving member 6. Then, a second switching state is brought about in which the control member 60 is turned clockwise, as shown in FIG. 4, and the turning position of the control member 60 is stably maintained by the urging force of the torsion spring 80.

In this case, as shown in FIG. 7, the switching member 101 is moved down by the helical groove 61*a* of the control member 60, and the idle gear 33 separates from the transmission gear 38 and is meshed with the small-diameter gear 45*b* of the double gear 45. Therefore, the power of the driving motor M1 can be transmitted from the double gear 32 to the double gear 45 through the idle gear 33, and further to the ring-shaped gear 44. Furthermore, the lock member 35 turns apart from the double gear 45, as shown in FIG. 9, and the double gear 45 is unlocked, so that the selection mechanism is allowed to be driven.

Accordingly, a disk selecting operation can be performed by rotating the ring-shaped gear 44 by the driving motor M1 so as to drive the guide columns 42 and to vertically move the disk holders 41. That is, the disk holders 41 can be vertically moved by rotating the ring-shaped gear 44 after the driving unit 50 is made to recede toward the loading slot 113.

When a disk holder 41 that holds a selected disk D is moved and stopped at the selecting position 41A shown in FIG. 1, the selected disk D opposes the disk transfer mechanism 5 composed of the guide member 11 and the transfer section 20. Then, the guide member 11 and the transfer section 20 move closer to each other and hold the disk D in the disk holder 41. In this case, the switching mechanism 100 is placed into a first switching state shown in FIG. 6 with the movement in the X2-direction of the transfer section 20, the power of the driving motor M1 is allowed to be transmitted to the driving section 20, and simultaneously, the ring-shaped gear 44 is locked by the lock member 35. Furthermore, the driving unit 50 is moved to the driving position shown in FIG. 2, and the transfer rollers 21, 22, 23, and 24 are driven counterclockwise. Consequently, the disk D in the selected disk holder 41 is drawn in the Y2-direction by the guide member 11 and the transfer section 20, and is clamped in the driving unit 50.

After the disk D is clamped on the turntable 56 in the driving unit 50, the guide member 11 and the transfer section 20 separate from the disk D and move to the transfer-force interrupting position, and the disk D is then rotated. In this case, when the first moving member 6 moves to the transfer-force interrupting position, the switching mechanism 100 is thereby placed into a second switching state, the power transmission from the driving motor M1 to the transfer section 20 is interrupted, and switching is made to transmit the power of the driving motor M1 to the selection mechanism.

In the selection mechanism, by detecting the rotating state of the ring-shaped gear 44 with a sensor, it can be detected which disk holder 41 is placed at the selecting position 41A and whether or not the disk holder 41 is precisely stopped at the selecting position 41A. This detection allows the disk holder 41 to be reliably selected. If the disk holder 41 is displaced from the selecting position 41A while the disk is being clamped and rotated in the driving unit 50, as described above, the position of the disk holder 41 can be adjusted by actuating the driving motor M1.

While the present invention has been described with reference to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A disk apparatus comprising:
    a stock section in which a plurality of disks are stored while being stacked in the axial direction thereof;
    a disk transfer mechanism for withdrawing a selected disk out of said stock section;
    a selection mechanism for changing the relative positions of said stock section and said disk transfer mechanism so that the selected disk and said disk transfer mechanism face each other;
    a rotating section for driving the disk withdrawn from said stock section;
    a common motor for supplying power to said selection mechanism and said disk transfer mechanism;
    a power transmission mechanism for selectively transmitting the power of said motor to said selection mechanism and to said disk transfer mechanism; and
    a switching mechanism for switching between a first switching state in which the power of said motor is transmitted to said disk transfer mechanism and a second switching state in which the power of said motor is transmitted to said selection mechanism,
    wherein said switching mechanism is switched between the first switching state and the second switching state by a moving force produced when said disk transfer mechanism moves between a transfer-force transmitting position for transmitting a transfer force to the disk and a transfer-force interrupting position spaced apart from the disk.

2. A disk apparatus according to claim 1, wherein said switching mechanism includes a control member that is turned by the moving force of said disk transfer mechanism, and said switching mechanism is switched between the first switching state and the second switching state in accordance with the direction of turning of said control member.

3. A disk apparatus according to claim 2, wherein said switching mechanism includes a switching member that reciprocally moves in the axial direction of said control member in conjunction with the turning of said control member, and an idle gear that is connected to said switching member so that the power of said motor is constantly provided thereto, and that is selectively meshed with a pair of gears in conjunction with the reciprocal movement of said switching member.

4. A disk apparatus according to claim 2, further comprising:
    a torsion spring for urging said control member in a turning direction such as to set the first switching state or a turning direction such as to set the second switching state.

5. A disk apparatus according to claim 1, wherein said disk transfer mechanism includes a pair of holding members that hold a peripheral edge of the disk and apply a transfer force to the disk, and said pair of holding members move between the transfer-force transmitting position for holding the disk therebetween and the transfer-force interrupting position spaced apart from the disk.

6. A disk apparatus according to claim 5, wherein one of said pair of holding members is a guide member having an elongated groove in which the peripheral edge of the disk is inserted and extending in a disk transfer direction, and the other of said pair of holding members is a transfer section comprising a plurality of transfer rollers that hold the disk between said transfer rollers and said elongated groove.

7. A disk apparatus according to claim 5, wherein said pair of holding members are supported by a first moving member and a second moving member movable closer to each other and further apart from each other, respectively, and said switching mechanism is placed into the first switching state or the second switching state by engaging one of said first moving member and said second moving member.

8. A disk apparatus according to claim 1, further comprising:
a lock member for locking said selection mechanism when said switching mechanism is placed in the first switching state and for unlocking said selection mechanism when said switching mechanism is switched from the first switching state to the second switching state.

9. A disk apparatus according to claim 8, wherein a portion of a power transmission path from said motor to said selection mechanism is locked by said lock member.

10. A disk apparatus according to claim 1, further comprising:
an urging member for stably holding said selection mechanism in the first switching state or the second switching state.

11. A disk apparatus comprising:
a stock section in which a plurality of disks are stored while being stacked in the axial direction thereof;
a disk transfer mechanism for withdrawing a selected disk out of said stock section;
a selection mechanism for changing the relative positions of said stock section and said disk transfer mechanism so that the selected disk and said disk transfer mechanism face each other;
a rotating section for driving the disk withdrawn from said stock section;
a common motor for supplying power to said selection mechanism and said disk transfer mechanism;
a power transmission mechanism for selectively transmitting the power of said motor to said selection mechanism and to said disk transfer mechanism;
a switching mechanism for switching between a first switching state in which the power of said motor is transmitted to said disk transfer mechanism and a second switching state in which the power of said motor is transmitted to said selection mechanism; and
a lock member for locking said selection mechanism when said switching mechanism is placed in the first switching state and for unlocking said selection mechanism when said switching mechanism is switched from the first switching state to the second switching state,
wherein said switching mechanism is switched between the first switching state and the second switching state by a moving force produced when said disk transfer mechanism moves between a transfer-force transmitting position for transmitting a transfer force to the disk and a transfer-force interrupting position spaced apart from the disk, and said lock member is moved between a position so as to lock said selection mechanism and a position so as to unlock said selection mechanism.

12. A disk apparatus according to claim 11, wherein said switching mechanism includes a control member that is turned by the moving force of said disk transfer mechanism, and said switching mechanism is switched between the first switching state and the second switching state in accordance with the direction of turning of said control member.

13. A disk apparatus according to claim 12, wherein said switching mechanism includes a switching member that reciprocally moves in the axial direction of said control member in conjunction with the turning of said control member, and an idle gear that is connected to said switching member so that the power of said motor is constantly provided thereto, and that is selectively meshed with a pair of gears in conjunction with the reciprocal movement of said switching member.

14. A disk apparatus according to claim 12, further comprising:
a torsion spring for urging said control member in a turning direction such as to set the first switching state or a turning direction such as to set the second switching state.

15. A disk apparatus according to claim 11, wherein said disk transfer mechanism includes a pair of holding members that hold a peripheral edge of the disk and apply a transfer force to the disk, and said pair of holding members move between the transfer-force transmitting position for holding the disk therebetween and the transfer-force interrupting position spaced apart from the disk.

16. A disk apparatus according to claim 15, wherein one of said pair of holding members is a guide member having an elongated groove in which the peripheral edge of the disk is inserted and extending in a disk transfer direction, and the other of said pair of holding members is a transfer section comprising a plurality of transfer rollers that hold the disk between said transfer rollers and said elongated groove.

17. A disk apparatus according to claim 15, wherein said pair of holding members are supported by a first moving member and a second moving member movable closer to each other and further apart from each other, respectively, and said switching mechanism is placed into the first switching state or the second switching state by engaging one of said first moving member and said second moving member.

18. A disk apparatus according to claim 11, wherein a portion of a power transmission path from said motor to said selection mechanism is locked by said lock member.

19. A disk apparatus according to claim 11, further comprising:
an urging member for stably holding said selection mechanism in the first switching state or the second switching state.

* * * * *